US008310606B2

(12) United States Patent
Itamasu et al.

(10) Patent No.: US 8,310,606 B2
(45) Date of Patent: Nov. 13, 2012

(54) DISPLAY DEVICE

(75) Inventors: Katsuhiko Itamasu, Kobe (JP); Koji Kishimoto, Kobe (JP); Koji Shinohe, Kobe (JP); Manabu Ishimoto, Kobe (JP); Hitoshi Hirakawa, Kobe (JP); Kenji Awamoto, Kobe (JP)

(73) Assignee: Shinoda Plasma Co., Ltd., Kobe-Shi (JP)

( * ) Notice: Subject to any disclaimer, the term of this patent is extended or adjusted under 35 U.S.C. 154(b) by 707 days.

(21) Appl. No.: 12/486,814

(22) Filed: Jun. 18, 2009

(65) Prior Publication Data

US 2009/0316411 A1 Dec. 24, 2009

(30) Foreign Application Priority Data

Jun. 18, 2008 (JP) ................................ 2008-159764
Apr. 15, 2009 (JP) ................................ 2009-098538

(51) Int. Cl.
*G02F 1/133* (2006.01)

(52) U.S. Cl. .................... 349/32; 313/231.31; 362/97.1; 362/97.4

(58) Field of Classification Search .................. 313/231. 31–231.61; 349/32; 362/600–632, 97.1–97.4
See application file for complete search history.

(56) References Cited

U.S. PATENT DOCUMENTS 7,309,149 B2 * 12/2007 Lee et al. ...................... 362/339
2006/0214554 A1 * 9/2006 Yamazaki et al. ............ 313/485

FOREIGN PATENT DOCUMENTS

JP 2003-150083 5/2003

* cited by examiner

*Primary Examiner* — William Carter
(74) *Attorney, Agent, or Firm* — Staas & Halsey LLP

(57) ABSTRACT

This invention provides a display device capable of maintaining a high image quality of a display image even when a plurality of plasma tube array-type display sub-modules is joined horizontally to one another. A display device comprises a plasma tube array-type display sub-module in which a plurality of plasma tubes 31, 31, . . . , are arranged in parallel being held between an address electrode support sheet where address electrodes are formed and a display electrode support sheet 35 where display electrodes are formed, wherein the plurality of plasma tube array-type display sub-modules 30, 30, . . . , are joined horizontally to one another so that an interval between the adjacent plasma tube array-type display sub-modules 30, 30, . . . , and a clearance between the adjacent plasma tubes 31, 31 are substantially equal.

15 Claims, 8 Drawing Sheets

DISPLAY DEVICE

CROSS-REFERENCE TO RELATED APPLICATIONS

This application claims priority to and the benefit of Japanese Application Ser. No. 2008-159764 which was filed Jun. 18, 2008, entitled Display Device, and Japanese Application Ser. No. 2009-098538 which was filed Apr. 15, 2009, entitled Display Device, the entirety of each being hereby incorporated by reference as if fully set forth herein.

BACKGROUND OF THE INVENTION

1. Field of the Invention

The present invention relates to a display device wherein a plurality of plasma tube array-type display sub-modules is joined to one another, thereby constructing a large-screen, more particularly to a display device capable of preventing the occurrence of a low brightness at a joining portion between the plurality of plasma tube array-type display sub-modules joined to one another.

2. Description of the Related Art

As a technology for realizing a next-generation large-screen display device, a plasma tube array-type display sub-module has been developed with a structure that a plurality of plasma tubes each filled with a discharge gas is arranged in parallel. For example, a large-screen display device having a scale of several meters by several meters in size can be constructed of a plasma tube array-type display system module that a plurality of plasma tube array-type display sub-modules of one square-meter in size is joined to one another. The display device of such a type that the plurality of plasma tube array-type display sub-modules is joined to one another does not need either a large glass substrate to be handled, like an LCD, a PDP and the like, nor a large-scale facility and achieves uniform image quality at low cost.

However, in case where the plurality of plasma tube array-type display sub-modules is joined horizontally to one another, the position adjustment of these modules requires a high precision in order to maintain a high quality of an image in a single plasma tube array-type display system module. A non-luminescent region is easily generated, particularly at the joining portion between the adjacent plasma tube array-type display sub-modules joined to one another, and a brightness is low in the region comparing to the other regions. Therefore, such a problem as black thin lines in an image easily occurs at the joining portion.

A technology for manufacturing a large-screen display device arranged a plurality of small display panels in parallel is disclosed in the JP 2003-150083 A, for example, which is a display device wherein the position of the display panels is position-adjusted and then secured by a positioning member so that distances between pixel arrays of the adjacent display panels can be equal. According to the display device wherein the distances between the pixel arrays, comprising the distance between the pixel arrays at the joining portion, are all equal, it can be avoided that the brightness in a particular region is lower than that in the other regions, which prevents the generation of the black thin lines in the image.

The invention disclosed in JP 2003-150083 A, however, has disadvantages in that it is not possible to equalize the clearance between the adjacent pixel arrays of the display panel and the clearance between the adjacent pixel arrays of the adjacent display panels unless a step of attaching the positioning member is separately provided, which results in the increase of manufacturing steps. Meanwhile, in the case where the plasma tube array-type display sub-modules are joined horizontally to one another, terminal portions of the display electrodes are bent toward the back side space along an outermost plasma tube at the side edges of the plasma tube array-type display sub-modules for electrical connection. Therefore, a certain gap width is occurred between the adjacent plasma tube array-type display sub-modules.

SUMMARY OF THE INVENTION

The present invention has been devised in order to solve the problems described above, and an object thereof is to provide a display device capable of maintaining a high quality of the display image even when a plurality of plasma tube array-type display sub-modules are joined to one another.

In order to achieve the object, a first aspect of the present invention is directed to a display device comprising at least two plasma tube array-type display sub-modules, each having a plurality of plasma tubes arranged in parallel, joined to one another so that outermost plasma tubes of each adjacent plasma tube array-type display sub-modules are adjacent to one another, wherein an interval between the adjacent plasma tube array-type display sub-modules is substantially equal to or smaller than a clearance between the adjacent plasma tubes in the respective plasma tube array-type display sub-modules.

According to the first aspect of the present invention, the non-luminescent region at the joining portion between the plasma tube array-type display sub-modules is inconspicuous, and the brightness can be thereby maintained substantially equal to that of the plasma tubes configuring other pixels. Thus, the display device capable of realizing a high quality of an image, in which disturbance such as the black thin lines displayed at the joining portion is not generated, can be provided without using any particular materials for adjusting the interval between the plasma tube array-type display sub-modules.

The "plasma tube array-type display sub-module" is a display film component, as described above, comprising a plasma tube array which is configured as described above, and denotes a semi-finished product of a display panel, without a drive circuit, a power-supply circuit, and the like. The "plasma tube array-type display system module" is structural components of a display device wherein a drive circuit is connected to one or a plurality of plasma tube array-type display sub-modules.

A second aspect of the present invention is directed to the display device according to the first aspect of the present invention, wherein the plasma tube array comprises a plurality of sets of three plasma tubes respectively encapsulating therein phosphors corresponding to red (R), green (G) and blue (B) arranged in parallel, wherein the interval between the adjacent plasma tube array-type display sub-modules is substantially equal to or smaller than a clearance between the sets of three plasma tubes.

According to the second aspect of the present invention, a display device capable of realizing a high quality of an image, in which a disturbance such as the black thin lines displayed at the joining portion is not generated, can be provided without using any particular materials for adjusting the interval between the plasma tube array-type display sub-modules.

A third aspect of the present invention is directed to a display device comprising at least two plasma tube array-type display sub-modules joined to one another, each comprising an address electrode support sheet having address electrodes formed thereon, a display electrode support sheet having display electrodes formed thereon, and a plasma tube array having a plurality of plasma tubes arranged in parallel, held between the address electrode support sheet and the display electrode support sheet, wherein the plasma tube array comprising a plurality of sets of three plasma tubes respectively encapsulating therein phosphors corresponding to red (R), green (G) and blue (B) arranged in parallel, is attached to a sub-module frame, and one plasma tube of the sets of three plasma tubes is arranged outside the sub-module frame at an end portion thereof.

According to the third aspect of the present invention, the plasma tube array comprising the plurality of sets of three plasma tubes respectively encapsulating therein phosphors corresponding to red (R), green (G) and blue (B) arranged in parallel, is attached to the sub-module frame, and one plasma tube of the sets of three plasma tubes is arranged outside of the sub-module frame at the end portion thereof. Accordingly, it can be obtained an effect equivalent to that in case where the interval between the adjacent sub-module frames is narrowed the size of one plasma tube even if the interval between the adjacent sub-module frames is larger than the clearance between the adjacent plasma tubes. Thus, the display device capable of realizing a high quality of an image, in which a disturbance such as the black thin lines displayed at the joining portion is not generated, can be provided without the delicate adjustment of positions where the plasma tube array-type display sub-modules are bonded to the sub-module frames.

Furthermore, in order to achieve the object, a fourth aspect of the present invention is directed to a display device comprising plasma tube array-type display sub-modules joined to one another comprising an address electrode support sheet having address electrodes formed thereon, a display electrode support sheet having display electrodes formed thereon, and a plasma tube array having a plurality of plasma tubes arranged in parallel, held between the address electrode support sheet and the display electrode support sheet, wherein a brightness compensating portion for compensating a brightness at a joining portion with another adjacent plasma tube array-type display sub-module is provided.

According to the fourth aspect of the present invention, the brightness can be compensated at the joining portion with the other adjacent plasma tube array-type display sub-modules even if the interval between the adjacent plasma tube array-type display sub-modules is larger than the clearance between the adjacent plasma tubes, and it thereby appears as if the non-luminescent region did not exist. Thus, the display device capable of realizing a high quality of an image, in which a disturbance such as the black thin lines displayed at the joining portion is not generated, can be provided without using any particular mechanism for adjusting the interval between the plasma tube array-type display sub-modules.

A fifth aspect of the present invention is directed to the display device according to the fourth aspect of the present invention, wherein a light diffusion member for diffusing light toward the side of another adjacent plasma tube array-type display sub-module is provided on the side of the joining portion with the adjacent plasma tube array-type display sub-module as the brightness compensating portion.

According to the fifth aspect of the present invention, the light can be diffused toward the side of the joining portion with the other adjacent plasma tube array-type display sub-module even if the interval between the adjacent plasma tube array-type display sub-modules is larger than the clearance between the adjacent plasma tubes, and it thereby appears as if the non-luminescent region did not exist.

A sixth aspect of the present invention is directed to the display device according to the fourth aspect of the present invention, wherein a light reflection member for reflecting light to the joining portion between the adjacent plasma tube array-type display sub-modules is provided as the brightness compensating portion.

According to the sixth aspect of the present invention, the light emitted from the plasma tube at the end portion of the adjacent plasma tube array-type display sub-module can be reflected toward the front side at the joining portion, which is the non-luminescent region, and it thereby appears as if the non-luminescent region did not exist.

A seventh aspect of the present invention is directed to the display device according to the fourth aspect of the present invention, wherein a light emission brightness of the plasma tubes arranged in the vicinity of the joining portion between the adjacent plasma tube array-type display sub-modules is increased as the brightness compensating portion.

According to the seventh aspect of the present invention, the light emission brightness of the plasma tubes arranged in the vicinity of the joining portion between the adjacent sub-module frames is increased, so that the non-luminescent region is inconspicuous.

An eighth aspect of the present invention is directed to the display device according to the fourth aspect of the present invention, wherein a size of the plasma tubes arranged in the vicinity of the joining portion between the adjacent plasma tube array-type display sub-modules is larger than that of the other plasma tubes as the brightness compensating portion.

According to the eighth aspect of the present invention, the light emission brightness of the plasma tubes arranged in the vicinity of the joining portion is increased, which makes the non-luminescent region inconspicuous.

A ninth aspect of the present invention is directed to a display device comprising a plurality of plasma tube array-type display sub-modules joined to one another in the extending direction of a display electrode pair comprising a plasma tube array having a plurality of plasma tubes filled with a discharge gas and arranged in parallel, address electrodes formed along the longitudinal direction of the plasma tubes, and a plurality of display electrode pairs extending in the direction crossing all the plasma tubes thereon so as to form a discharge cell at each of an intersection of the address electrode and the display electrode pair, wherein the plasma tubes of the plasma tube array-type display sub-module are arranged so that a clearance between pixels constituted by one or a plurality of discharge cells formed along the display electrode pairs is provided, and the clearance between the pixels is adjusted substantially equal to a clearance between the adjacent plasma tubes arranged outermost of the plurality of plasma tubes in the adjacent plasma tube array-type display sub-modules.

According to the ninth aspect of the present invention, the non-luminescent region at the joining portion between the adjacent plasma tube array-type display sub-modules is inconspicuous, and the brightness can be thereby maintained substantially equal to that of the plasma tubes configuring other pixels.

As described above, the interval between the adjacent plasma tube array-type display sub-modules is set to be substantially equal to the clearance between the adjacent plasma tubes, or the interval between the adjacent plasma tube array-type display sub-modules is set to be equal to or smaller than the clearance between the adjacent plasma tubes. Thus configured, the non-luminescent region at the joining portion between the plasma tube array-type display sub-modules is inconspicuous, and a brightness substantially equal to that of the plasma tubes configuring other pixels can be thereby maintained. Thus, a display device capable of realizing a high quality of an image, in which a disturbance such as the black thin lines displayed at the joining portion is not generated, can be provided without using any particular materials for adjusting the interval between the plasma tube array-type display sub-modules.

DESCRIPTION OF THE PREFERRED EMBODIMENTS

Figure 1C:
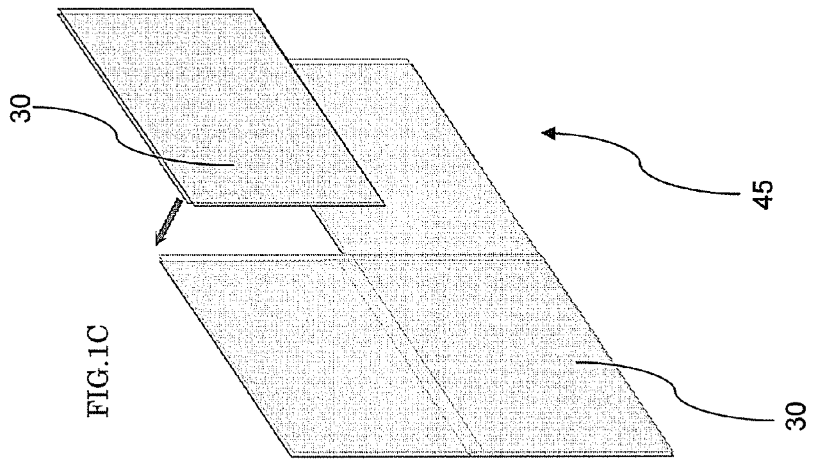
FIGS. 1A to 1C are perspective views schematically showing a configuration of a plasma tube array-type display sub-module in a display device according to a first embodiment of the present invention.

Hereinafter, a display device according to preferred embodiments of the present invention is described in detail referring to the drawings.

First Embodiment

Figure 1A:
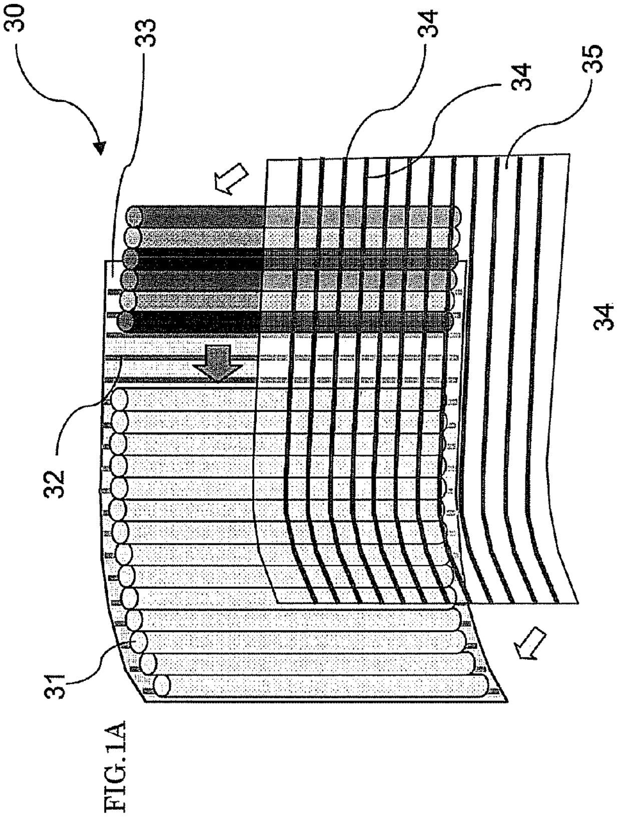
Figure 1B:
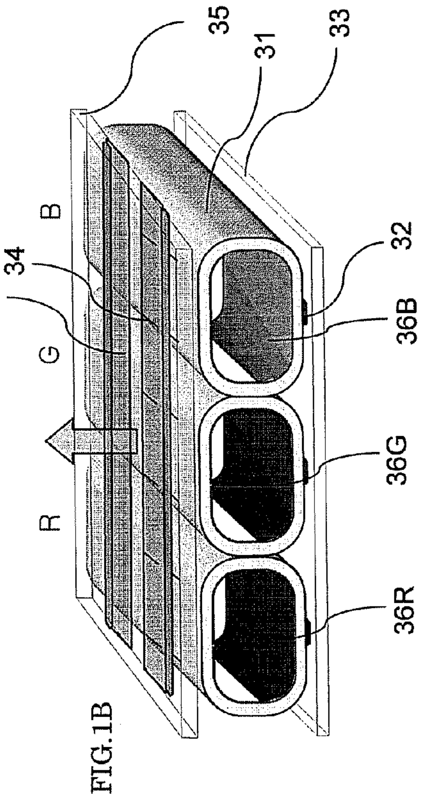

FIGS. 1A to 1C are perspective views schematically showing a configuration of a plasma tube array-type display sub-module in the display device according to the first embodiment of the present invention. FIG. 1A is a perspective view schematically showing a configuration of a plasma tube array of the plasma tube array-type display sub-module. FIG. 1B is a perspective view partly showing a configuration of the plasma tube array of the plasma tube array-type display sub-module. FIG. 1C is a perspective view showing a plasma tube array-type display system module, wherein the plasma tube array-type display sub-modules are joined vertically and horizontally to one another.

As shown in FIG. 1A, the plasma tube array-type display sub-module 30 according to this embodiment has a rectangular shape as it comprises a part of a rectangular screen and a plurality of plasma tubes 31, 31, . . . each filled with a discharge gas is arranged in parallel. The plasma tube 31 is a discharging thin tube made of glass, whose diameter is not particularly limited, but preferably about 0.5 to 5 mm. Herein, for example, the plasma tube array-type display sub-module 30 of one square-meter is constructed in such a manner that 1000 pieces of glass thin tubes each having a diameter of 1 mm, a length of 1 m and an oblate ellipsoid section are arranged in parallel by a set of several pieces. The section of the thin tube is not particularly limited in shape, and examples thereof may include a circular section, an oblate ellipsoid section, a square section and the like. Moreover, the plasma tube 31 is filled with a discharge gas such as neon, xenon and the like at a predetermined ratio at a predetermined pressure.

The plurality of plasma tubes 31, 31, . . . arranged in parallel with one another is held between a back-side address electrode support sheet 33, which comprises a plurality of address electrodes 32, 32, . . . formed thereon so as to come into contact with the lower surface of the plasma tubes 31, 31, . . . in the longitudinal direction of the plasma tubes 31, 31, . . . , and a front-side (display-side) display electrode support sheet 35, which comprises a plurality of display electrodes 34, 34, . . . formed thereon so as to cross the upper side of the plasma tubes 31, 31, . . . orthogonal to the longitudinal direction of the plasma tubes 31, 31, . . . . Herein, the display electrode support sheet 35 is a flexible sheet made of, for example, a polycarbonate film, a PET (polyethylene terephthalate) film or the like.

The plurality of display electrodes 34, 34, . . . is formed in stripes on the inner surface of the display electrode support sheet 35 and comes into contact with the upper surface of the plasma tubes 31, 31, . . . . The adjacent display electrodes 34, 34 form a display electrode pair and function as an X electrode and a Y electrode. Display discharge occurs inside the display tube 31 located between the X electrode and the Y electrode. In addition to the stripe pattern, the pattern of the display electrodes 34, 34, . . . may be a pattern which is publicly known in the relevant technical field, and examples thereof may include a mesh pattern, a ladder pattern, a comb pattern and the like. Moreover, the display electrode 34 can be formed by various materials which are publicly known in the relevant technical field. Examples of the materials for the display electrode 34 may include transparent conductive materials such as ITO (Indium Tin Oxide) and $SnO_2$, and metal conductive materials such as Ag, Au, Al, Cu and Cr and the like.

The display electrodes 34, 34 can be formed by various methods which are publicly known in the relevant technical field. For example, the display electrode 34 may be formed by using a thick film technology, such as a printing, or by using a thin film technology such as a physical deposition method or a chemical deposition method. Examples of the thick film technology may include a screen print method and the like. With regard to the thin film technology, examples of the physical deposition method may include an evaporation method, a sputtering method and the like whereas examples of the chemical deposition method may include a thermal CVD method, a photo-CVD method, a plasma CVD method and the like.

The address electrode 32 is formed on the back side of the plasma tube array-type display sub-module 30 in correspondence with each plasma tube 31 along the longitudinal direction of the plasma tubes 31, 31, . . . wherein an emit light discharge cell is formed at an intersection of the address electrode 32 and the display electrode pair 34. The address electrode 32 can be formed by various materials and methods which are publicly known in the relevant technical field.

In the configuration described above, as shown in FIG. 1B, the plasma tube array-type display sub-module 30 achieves color display in such a manner that each plasma tube 31 comprises a single-color phosphor layer 36. Examples of the phosphor layer 36 comprise a red (R) phosphor layer 36R, a green (G) phosphor layer 36G and a blue (B) phosphor layer 36B. A set of the plasma tube 31 comprising the R phosphor layer 36R, the plasma tube 31 comprising the G phosphor layer 36G and the plasma tube 31 comprising the B phosphor layer 36B forms one pixel, so that the plasma tube array-type display sub-module 30 can achieve color display. Herein, the R phosphor layer 36R is made of a phosphor material such as $(Y,Gd)BO_3:EU^{3+}$ in order to emit red light by irradiation with ultraviolet rays. The G phosphor layer 36G is made of a phosphor material such as $Zn_2SiO_4:Mn$ in order to emit green light by irradiation with ultraviolet rays. The B phosphor layer 36B is made of a phosphor material such as $BaMgAl_{12}O_{17}:Eu^{2+}$ in order to emit blue light by irradiation with ultraviolet rays. In order to enhance flexibility of the plasma tube array-type display sub-module 30 and facilitate the assembly thereof, preferably, a plasma tube unit is prepared in such a manner that the plurality of the set of the three plasma tubes for three colors R, G, B are attached to the reed-shaped back-side address electrode support sheet 33 in parallel, and then the plurality of plasma tube units is attached to the front-side display electrode support sheet 35, so that the plasma tube array-type display sub-module 30 for a color display is fabricated.

As shown in FIG. 1C, herein, four plasma tube array-type display sub-modules 30, 30, . . . construct one plasma tube array-type display system module 45 having a large screen. Each plasma tube array-type display sub-module 30 is a semi-finished product which does not have a drive circuit, a power supply circuit and the like incorporated. After construction of the large-screen plasma tube array-type display system module 45, a drive circuit, a power supply circuit and the like are incorporated in the display system module 45 which is entirely defined as one display film. Thus, a large-screen display device can be constructed. This display device has a feature capable of suppressing a variation in quality of images displayed on the respective plasma tube array-type display sub-modules 30, 30, . . . . The plasma tube array-type display sub-modules 30, 30 joined horizontally to one another can be commonly driven by connecting their display electrodes 34, 34 by the disclosed configuration of the present invention. The two upper plasma tube array-type display sub-modules 30, 30 and two lower plasma tube array-type display sub-modules 30, 30 joined vertically to one another can be driven in parallel by a known method, so-called dual scan without connecting the address electrodes 32, 32 to each other by making the address electrodes 32, 32 led out upward and downward of the screen and connecting the address electrodes 32 to an address drive circuit.

At a joining portion between the plasma tube array-type display sub-modules 30, 30, arranged in a lateral direction, a display electrode support sheet forming respectively the display electrode pairs 34, 34, . . . on a rear surface, and an electromagnetic wave shield layer on a front surface is bent, and the display electrodes and the electromagnetic wave shield layers of the adjacent plasma tube array-type display sub-modules 30, 30 are electrically connected on the back side of the screen respectively. Therefore, a clearance is inevitably generated at the joining portion between the plasma tube array-type display sub-modules 30, 30, and black thin lines or the like are displayed on the screen as a non-luminescent region in the case where the clearance is too large.

Figure 2A:
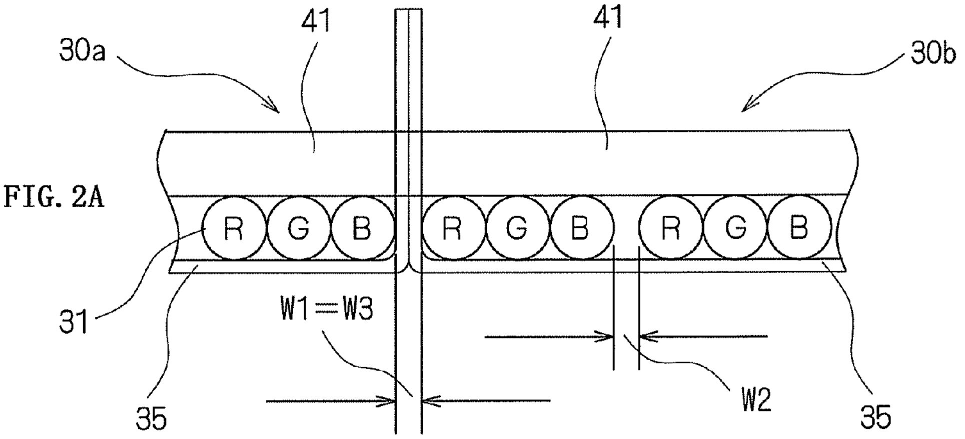
FIGS. 2A to 2C are sectional views, orthogonal to plasma tubes, schematically showing a configuration of a joining portion between the plasma tube array-type display sub-modules according to the first embodiment of the present invention.
Figure 2B:
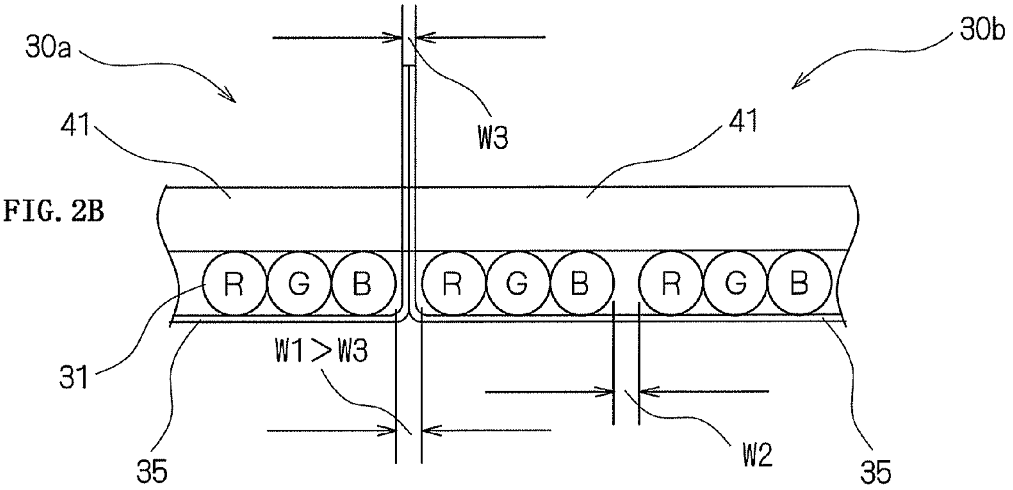
Figure 2C:
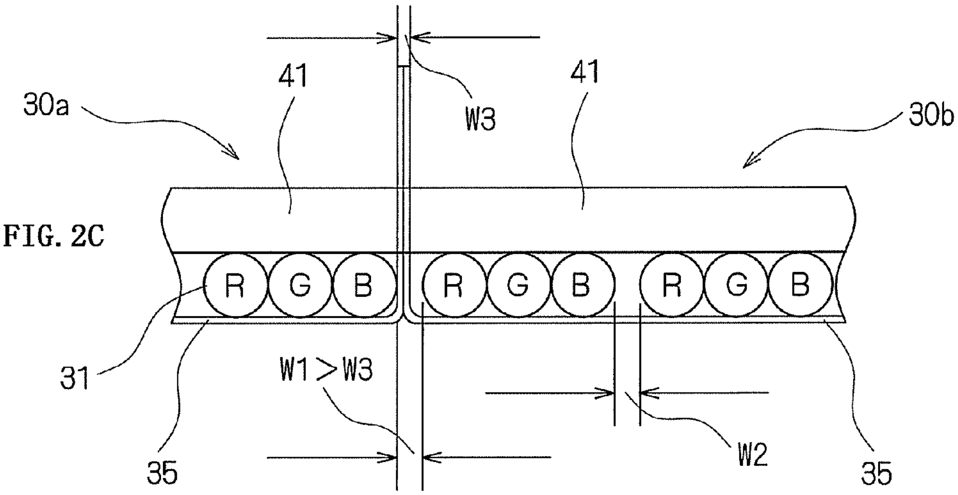

In the present invention, in order to make the non-luminescent region generated between the adjacent plasma tube array-type display sub-modules 30, 30 inconspicuous, the plasma tube array-type display sub-modules 30, 30 are processed so that the non-luminescent region generated between the adjacent plasma tube array-type display sub-modules 30, 30 is smaller than the clearance between the plasma tubes 31, 31. FIGS. 2A to 2C are sectional views, orthogonal to the plasma tubes 31, 31, . . . , schematically showing a configuration of the joining portion between the plasma tube array-type display sub-modules 30, 30 according to the first embodiment of the present invention. In FIGS. 2A to 2C, the plasma tubes 31, 31, 31 for three colors respectively comprising the red (R) phosphor layer 36R, the green (G) phosphor layer 36G, and the blue (B) phosphor layer 36B form one set, thereby configuring one pixel.

FIG. 2A is a partial sectional view schematically showing the joining portion between the plasma tube array-type display sub-modules 30, 30 according to the first embodiment of the present invention. As shown in FIG. 2A, when the plasma tube array-type display sub-modules 30*a*, 30*b* adjacent thereto are joined to each other, a bending process is applied to the display electrode support sheets 35 (including the electromagnetic wave shield layer, surface protection layer and the like, but omitted for a simple description) so that the display electrode support sheets 35 are bent along sub-module frames 41, 41 and thereby led toward the back side of the plasma tube array-type display sub-modules 30*a*, 30*b*.

Therefore, in an interval W1 between the plasma tube array-type display sub-modules 30*a*, 30*b* adjacent each other, there is the non-luminescent region of the width substantially equal to a width W3 corresponding to the twice of the thickness of the display electrode support sheets 35, 35. Moreover, there is a constant clearance W2 generated between one set of three plasma tubes 31, 31, 31 and another set of three plasma tube 31, 31, 31 adjacent thereto since the address electrode support sheet (not shown) is formed by each of the sets of three plasma tubes 31, 31, 31.

Even in the case where the interval W1 between the plasma tube array-type display sub-modules 30*a*, 30*b* adjacent to each other is equal to the clearance W2 between the plasma tubes 31, 31, or the interval W1 between the plasma tube array-type display sub-modules 30*a*, 30*b* adjacent to each other is smaller than the clearance W2 between the plasma tubes 31, 31, a clearance between pixels of the displayed image and a width of the non-luminescent region at the joining portion are substantially equal. Accordingly, it can be avoided that the display image shows the black thin lines only at the joining portion.

The desirable effect can be obtained as far as the interval W1 between the plasma tube array-type display sub-modules 30*a*, 30*b* adjacent to each other is equal to the clearance W2 between the plasma tubes 31, 31. Therefore, a positional relationship between the bent display electrode support sheets 35, 35 and the adjacent plasma tubes 31, 31 has greater flexibility in the case where the display electrode support sheets 35, 35 are sufficiently thin. For example, as shown in FIG. 2B, in the case where the interval W1 between the plasma tube array-type display sub-modules 30*a*, 30*b* adjacent to each other is larger than the width W3 corresponding to the width of two display electrode support sheets 35, 35, the plasma tubes 31, 31 at the end portion of the adjacent plasma tube array-type display sub-modules 30*a*, 30*b* may be arranged so that neither of them contacts the bent display electrode support sheets 35, 35. Alternatively, as shown in FIG. 2C, the plasma tubes 31, 31 at the end portion of the adjacent plasma tube array-type display sub-modules 30*a*,

30*b* may be arranged so that they contact either one of the bent display electrode support sheets 35, 35.

As described above, according to the first embodiment, the thickness of the display electrode support sheet 35 is suppressed in the fabrication process of the plasma tube array-type display sub-modules 30, 30, . . . joined to each other, thereby configuring the plasma tube array-type display system module 45. Accordingly, the non-luminescent region at the joining portion between the adjacent plasma tube array-type display sub-modules 30, 30 is inconspicuous, and a brightness substantially equal to that of the plasma tubes 31, 31, . . . configuring other pixels can be maintained. Thus, a display device capable of realizing a high quality of a display image, in which a disturbance such as black thin lines displayed at the joining portion is not generated, can be provided without using any particular materials for adjusting the interval between the plasma tube array-type display sub-modules 30, 30.

The description of the first embodiment is given referring to the case where the three plasma tubes 31, 31, 31 for three colors respectively comprising the red (R) phosphor layer 36R, the green (G) phosphor layer 36G, and the blue (B) phosphor layer 36B form one set, thereby configuring one pixel, but the present embodiment is not limited thereto and the plasma tubes 31, 31, . . . may be independent from one another. A similar effect can be obtained as far as the interval W1 between the plasma tube array-type display sub-modules 30*a*, 30*b* adjacent to each other and the clearance W2 between the plasma tubes 31, 31 are in a manner similar to the foregoing description.

Second Embodiment

A plasma tube array-type display sub-module 30 and a plasma tube array-type display system module 45 according to the second embodiment of the present invention are configured in a manner similar to the first embodiment. Therefore, the same reference symbols are appended to the similar components, and the detailed description will be omitted. The second embodiment is different from the first embodiment in that, in the case where the three plasma tubes 31, 31, 31 for three colors respectively comprising the red (R) phosphor layer 36R, the green (G) phosphor layer 36G, and the blue (B) phosphor layer 36B form one set thereby configuring one pixel, the sets of three plasma tubes 31, 31, 31 which are most proximate to the joining portion between the plasma tube array-type display sub-module 30*a* and the plasma tube array-type display sub-module 30*b* adjacent to each other are shifted toward the joining portion.

Figure 3A:
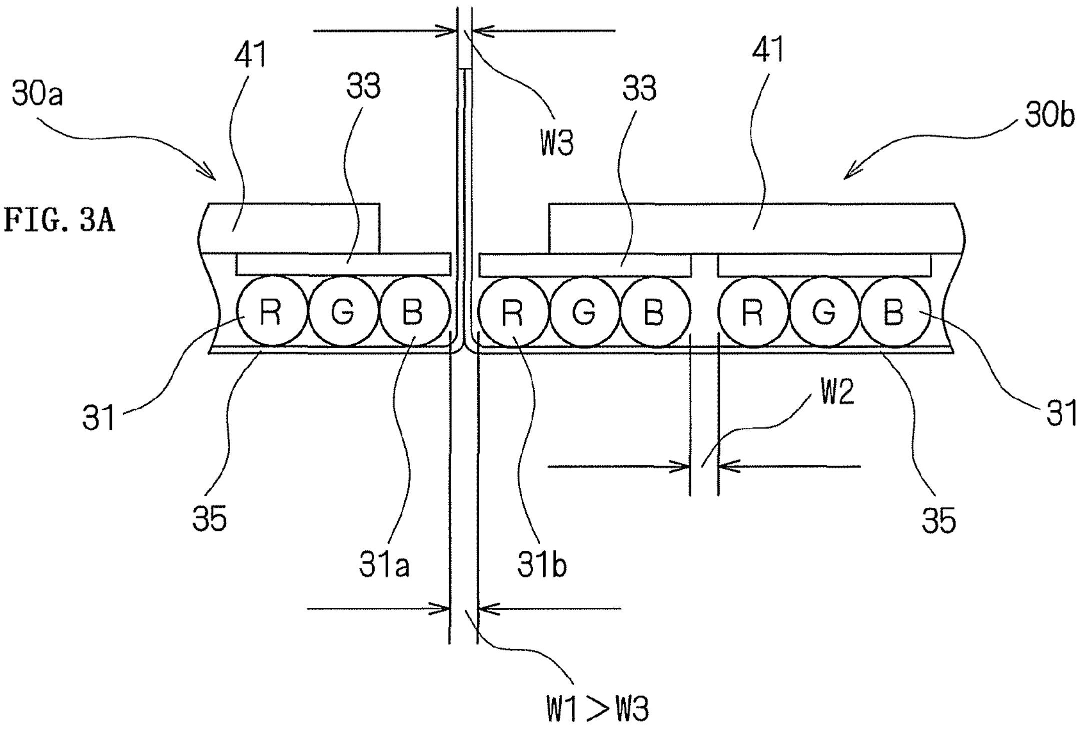
FIGS. 3A and 3B are sectional views, orthogonal to the plasma tubes, schematically showing a configuration of the joining portion between the plasma tube array-type display sub-modules according to a second embodiment of the present invention.
Figure 3B:
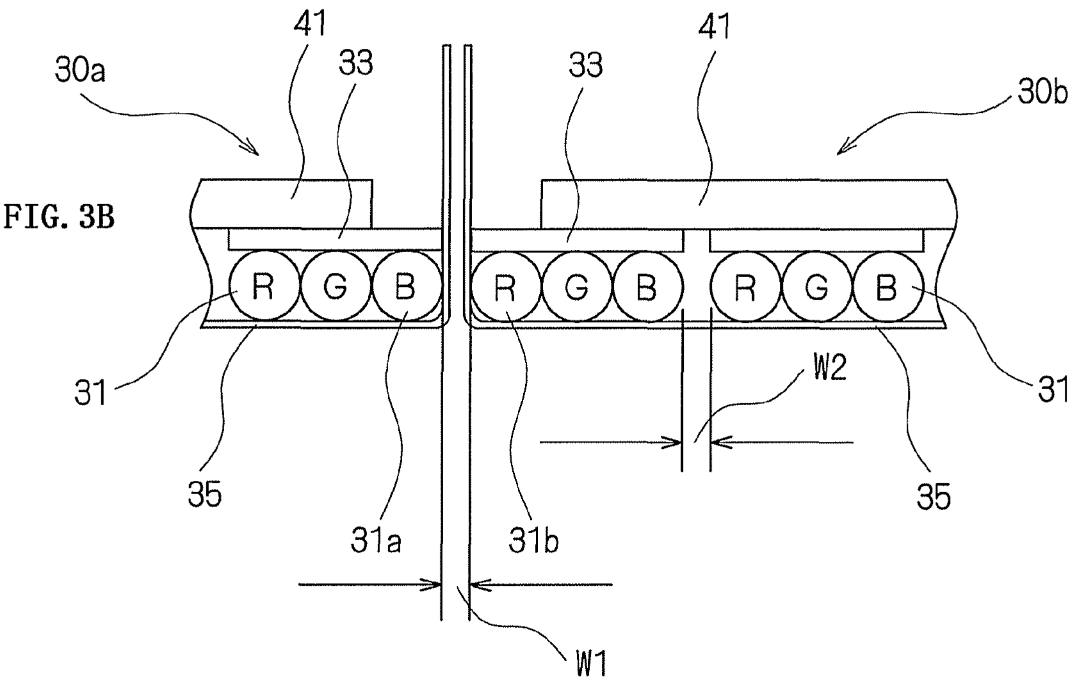

FIGS. 3A and 3B are sectional views, orthogonal to the plasma tubes 31, 31, . . . , schematically showing a configuration of the joining portion between the plasma tube array-type display sub-modules 30, 30 according to the second embodiment of the present invention. As shown in FIG. 3A, the address electrode support sheet 33 provided with the address electrodes (not shown) are formed on the side of the sub-module frames 41, 41, . . . of the respective sets of three plasma tubes 31, 31, 31, and the address electrode support sheet 33 is bonded to the sub-module frame 41 via adhesive layer made of a glue or the like.

In the second embodiment, the address electrode support sheet 33 is shifted and then bonded so that, of the sets of three plasma tubes 31, 31, 31, plasma tubes 31*a*, 31*b* which are most proximate to the joining portion between the plasma tube array-type display sub-modules 30, 30 are protruded from the sub-module frames 41, 41, . . . . The display electrode support sheets 35, 35 are bent along the plasma tubes 31*a*, 31*b* arranged outside of the sub-module frames 41, 41, and thereby led to the back side of the plasma tube array-type display sub-modules 30*a*, 30*b*.

Therefore, even if there is a long distance between the end portions of the sub-module frames 41, 41, the interval W1 between the plasma tube array-type display sub-modules 30*a*, 30*b* adjacent to each other is at most the width W3 corresponding to the width of two display electrode support sheets 35, 35. Since the address electrode support sheet 33 is formed by each of the sets of three plasma tubes 31, 31, 31, the clearance between the pixels of the displayed image and the width of the non-luminescent region at the joining portion are substantially equal in the case where the clearance W2 between the sets of three plasma tubes 31, 31, 31 adjacent to each other and the interval W1 between the adjacent plasma tube array-type display sub-modules 30*a*, 30*b* are equal, or the interval W1 between the plasma tube array-type display sub-modules 30*a*, 30*b* adjacent to each other is smaller than the clearance W2 between the adjacent plasma tubes 31, 31. Accordingly, it can be avoided that the display image shows the black thin lines only at the joining portion.

The desirable effect can be obtained as far as the interval W1 between the plasma tube array-type display sub-modules 30*a*, 30*b* adjacent to each other is equal to the clearance W2 between the plasma tubes 31, 31. Therefore, a positional relationship between the bent display electrode support sheets 35, 35 and the adjacent plasma tubes 31*a*, 31*b* has greater flexibility in the case where the display electrode support sheets 35, 35 are sufficiently thin. For example, as shown in FIG. 3A, in the case where the width W3 corresponding to the width of two display electrode support sheets 35, 35 is narrower than the interval W1 between the plasma tube array-type display sub-modules 30*a*, 30*b* adjacent to each other, the plasma tubes 31*a*, 31*b* at the end portion of the adjacent plasma tube array-type display sub-modules 30*a*, 30*b* may be arranged so that neither of them contacts the bent display electrode support sheets 35, 35. Alternatively, as shown in FIG. 3B, the plasma tubes 31*a*, 31*b* at the end portion of the adjacent plasma tube array-type display sub-modules 30*a*, 30*b* may be arranged so that they contact either one of the bent display electrode support sheets 35, 35.

As described above, according to the second embodiment, even if the interval between the adjacent sub-module frames 41, 41 is larger than the clearance between the adjacent plasma tubes 31, 31, it can be expected to obtain an effect equivalent to that of narrowing the interval between the adjacent sub-module frames 41, 41 to the size of one plasma tube 31. Thus, a display device capable of realizing a high quality of a display image, in which a disturbance such as the black thin lines displayed at the joining portion is not generated, can be provided without the delicate adjustment of positions where the plasma tube array-type display sub-modules 30, 30 are bonded to the sub-module frames 41, 41.

Third Embodiment

A plasma tube array-type display sub-module 30 and a plasma tube array-type display system module 45 according to the third embodiment of the present invention are configured in a manner similar to the first and second embodiments. Therefore, the same reference symbols are appended to the similar components, and the detailed description will be omitted. The third embodiment is different from the first and second embodiments in that a brightness compensating portion for compensating a brightness in the non-luminescent region at the joining portion with the other adjacent plasma tube array-type display sub-module 30 is provided. The third embodiment is described referring to the case where a light diffusion member is provided as the brightness compensating portion.

Figure 4:
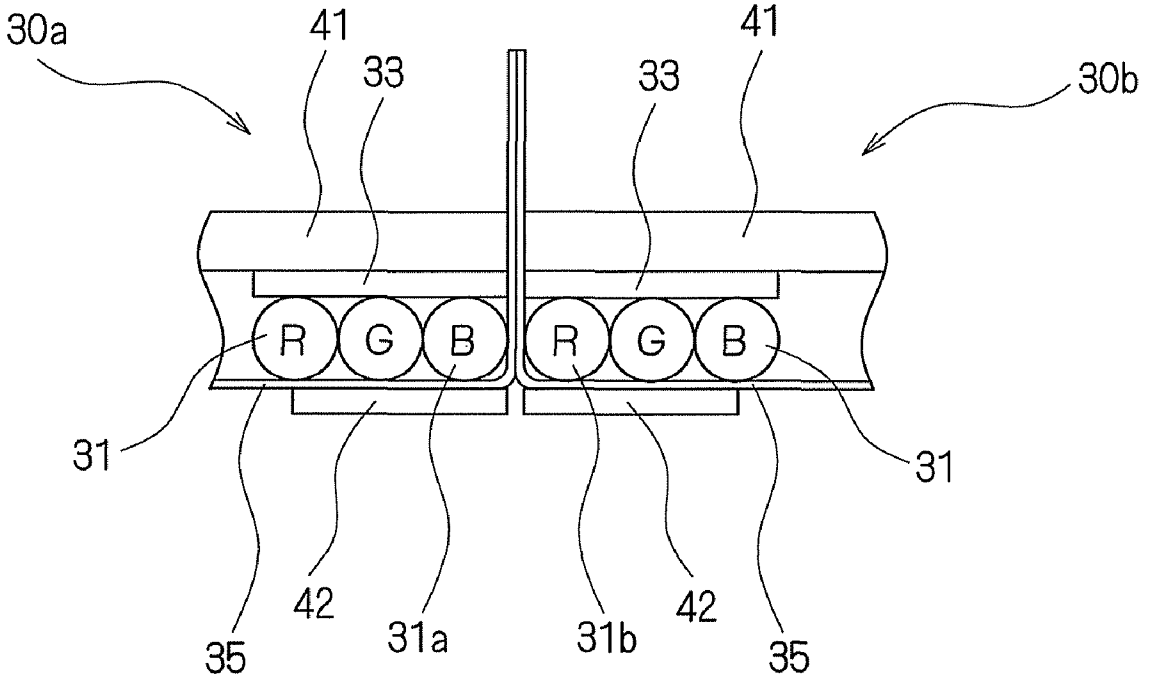
FIG. 4 is a sectional view, orthogonal to the plasma tubes, schematically showing a configuration of the joining portion between the plasma tube array-type display sub-modules according to a third embodiment of the present invention.

FIG. 4 is a sectional view, orthogonal to the plasma tubes 31, 31, . . . , schematically showing a configuration of the joining portion between the plasma tube array-type display sub-modules 30, 30 according to the third embodiment of the present invention. As shown in FIG. 4, the address electrode support sheet 33 provided with the address electrodes (not shown) are formed on the side of the sub-module frames 41, 41, . . . of the sets of three plasma tubes 31, 31, 31, and the address electrode support sheet 33 is bonded to the sub-module frame 41 via an adhesive layer made of a glue or the like.

In the third embodiment, light diffusion members 42, 42 are provided on front end portions of the adjacent plasma tube array-type display sub-modules 30, 30, so as to diffuse scattered light of the plasma tubes 31*a*, 31*b*, which are most proximate to the joining portion between the plasma tube array-type display sub-modules 30, 30 of the sets of three plasma tubes 31, 31, 31, to the side of the other adjacent plasma tube array-type display sub-module 30. Therefore, even in the case where there is a long distance between the end portions of the sub-module frames 41, 41, a certain degree of brightness is assured in the non-luminescent region by the diffused scattered light. Accordingly, it can be avoided that the display image shows the black thin lines only at the joining portion.

As described above, according to the third embodiment, even in the case where the interval between the adjacent plasma tube array-type display sub-modules 30, 30 is larger than the clearance between the adjacent plasma tubes 31, 31, the light can be diffused toward the joining portion with the other adjacent plasma tube array-type display sub-module 30, and it thereby appears as if the non-luminescent region did not exist.

Fourth Embodiment

A plasma tube array-type display system module 45 according to the fourth embodiment of the present invention is different from the third embodiment in that a light reflection member is provided as the brightness compensating portion.

Figure 5:
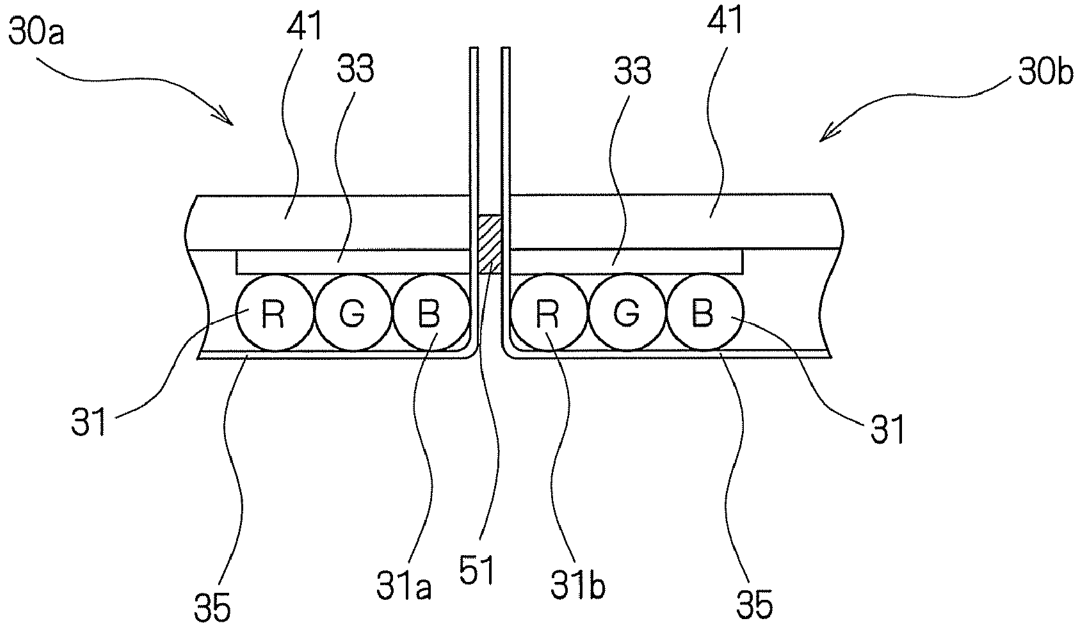
FIG. 5 is a sectional view, orthogonal to the plasma tubes, schematically showing a configuration of the joining portion between the plasma tube array-type display sub-modules according to a fourth embodiment of the present invention.

FIG. 5 is a sectional view, orthogonal to the plasma tubes 31, 31, . . . , schematically showing the configuration of the joining portion between the plasma tube array-type display sub-modules 30, 30 according to the fourth embodiment of the present invention. As shown in FIG. 5, the address electrode support sheet 33 provided with the address electrodes (not shown) are formed on the side of the sub-module frames 41, 41, . . . of the sets of three plasma tubes 31, 31, 31, and the address electrode support sheet 33 is bonded to the sub-module frame 41 via an adhesive layer made of a glue or the like.

In the fourth embodiment, a light reflection bar 51 for reflecting light is held in the clearance between the bent display electrode support sheets 35, 35. The light reflection bar 51 is provided on the back side relative to the position where the sets of three plasma tubes 31, 31, 31 are provided. Accordingly, the light of the plasma tubes 31*a*, 31*b* which are most proximate to the joining portion between the plasma tube array-type display sub-modules 30*a*, 30*b* can be reflected by the light reflection bar 51 toward the front side of the plasma tube array-type display sub-modules 30, 30, . . . . Therefore, even in the case where the distance between the end portions of the sub-module frames 41, 41 is long, a certain degree of brightness is assured in the non-luminescent region by the reflected scattered light. Accordingly, it can be avoided that the display image shows the black thin lines only at the joining point.

The description of the fourth embodiment is given referring to the case where the plasma tubes 31, 31, 31 for three colors respectively comprising the red (R) phosphor layer 36R, the green (G) phosphor layer 36G, and the blue (B) phosphor layer 36B form one set, thereby configuring one pixel, but the present embodiment is not limited thereto, and the plasma tubes 31, 31, . . . may be independent from one another. A similar effect can be obtained as far as the reflected light of the plasma tubes 31*a*, 31*b* which are most proximate to the adjacent plasma tube array-type display sub-modules 30*a*, 30*b* can be reflected toward the front side of the plasma tube array-type display sub-modules 30*a*, 30*b*.

Fifth Embodiment

A plasma tube array-type display system module 45 according to the fifth embodiment of the present invention is different from the third and fourth embodiments in that a light emission brightness of the plasma tubes 31*a*, 31*b* which are most proximate to the joining portion is increased as the brightness compensating portion.

Figure 6:
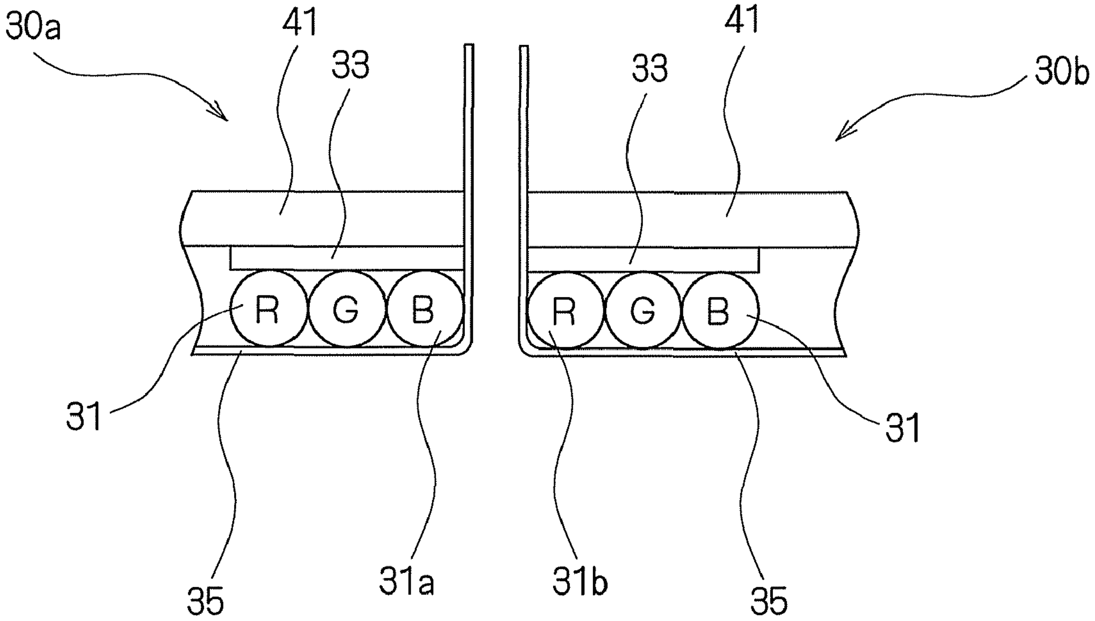
FIG. 6 is a sectional view, orthogonal to the plasma tubes, schematically showing a configuration of the joining portion between the plasma tube array-type display sub-modules according to a fifth embodiment of the present invention.

FIG. 6 is a sectional view, orthogonal to the plasma tubes 31, 31, . . . , schematically showing the configuration of the joining portion between the plasma tube array-type display sub-modules 30, 30 according to the fifth embodiment of the present invention. As shown in FIG. 6, the address electrode support sheet 33 provided with the address electrodes (not shown) is formed on the side of the sub-module frames 41, 41, . . . of the sets of three plasma tubes 31, 31, 31, and the address electrode support sheet 33 is bonded to the sub-module frame 41 via an adhesive layer made of a glue or the like.

In the fifth embodiment, an output voltage is adjusted so that the light emission brightness of the plasma tubes 31*a*, 31*b* which are most proximate to the joining portion between the plasma tube array-type display sub-modules 30*a*, 30*b* is increased in comparison to the light emission brightness of the other plasma tubes 31, 31, . . . . Accordingly, the light emission brightness of the plasma tubes 31*a*, 31*b* which are most proximate to the joining portion between the plasma tube array-type display sub-modules 30*a*, 30*b* is higher than the light emission brightness of the other plasma tubes 31, 31, . . . . Thus, a certain degree of brightness can be assured in the non-luminescent region regardless of a long distance between the end portions of the sub-module frames 41, 41, and it can be prevented that the display image shows the black thin lines only at the joining portion.

The description of the fifth embodiment is given referring to the case where the plasma tubes 31, 31, 31 for three colors respectively comprising the red (R) phosphor layer 36R, the green (G) phosphor layer 36G, and the blue (B) phosphor layer 36B form one set, thereby configuring one pixel, but the present embodiment is not limited thereto, and the plasma tubes 31, 31, . . . may be independent from one another. A similar effect can be obtained as far as the light emission brightness of the plasma tubes 31*a*, 31*b* which are most proximate to the adjacent plasma tube array-type display sub-modules 30, 30 is increased in comparison to that of the other plasma tubes 31, 31, . . . .

Sixth Embodiment

A plasma tube array-type display system module 45 according to the sixth embodiment of the present invention is different to the third to fifth embodiments in that a size of the plasma tubes 31*a*, 31*b* which are most proximate to the joining portion, for example, a diameter thereof or the like, is enlarged in the case where sectional surfaces of the plasma tubes 31*a*, 31*b* have a circular shape as the brightness compensating portion.

Figure 7:
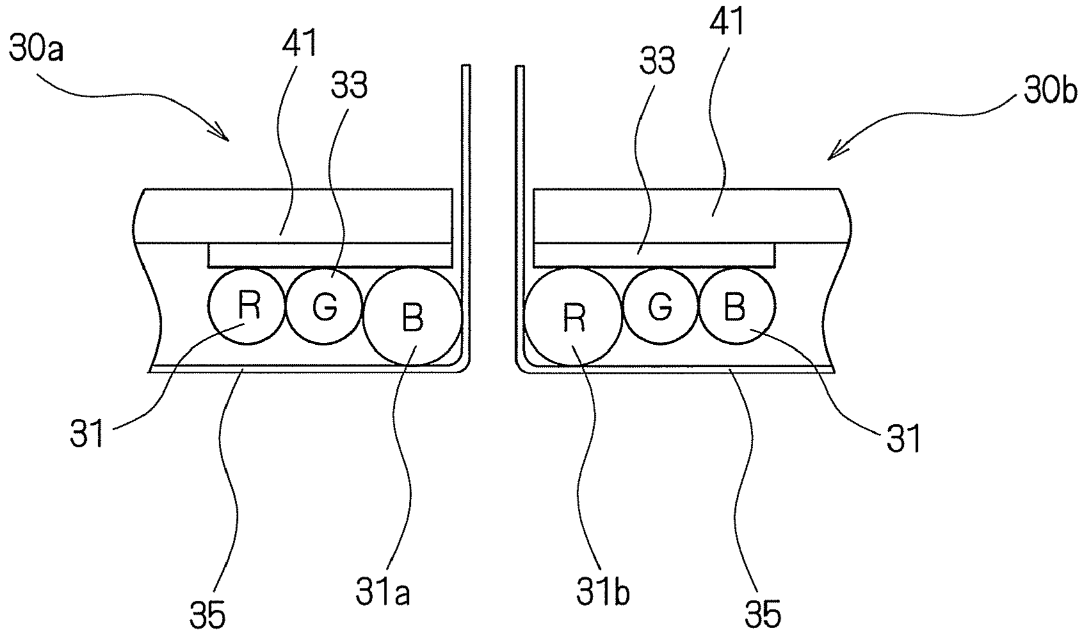
FIG. 7 is a sectional view, orthogonal to the plasma tubes, schematically showing a configuration of the joining portion between the plasma tube array-type display sub-modules according to a sixth embodiment of the present invention.

FIG. 7 is a sectional view, orthogonal to the plasma tubes 31, 31, . . . , schematically showing the configuration of the joining portion between the plasma tube array-type display sub-modules 30, 30 according to the sixth embodiment of the present invention. As shown in FIG. 7, the address electrode support sheet 33 provided with the address electrodes (not shown) are formed on the side of the sub-module frames 41, 41, . . . of the sets of three plasma tubes 31, 31, 31, and the address electrode support sheet 33 is bonded to the sub-module frame 41 via an adhesive layer made of a glue or the like.

In the sixth embodiment, the size of the plasma tubes 31*a*, 31*b* which are most proximate to the joining portion between the plasma tube array-type display sub-modules 30*a*, 30*b* is enlarged in comparison to the size of the other plasma tubes 31, 31, . . . . Accordingly, the light emission brightness of the plasma tubes 31*a*, 31*b* which are most proximate to the joining portion between the plasma tube array-type display sub-modules 30*a*, 30*b* is higher than the light emission brightness of the other plasma tubes 31, 31, . . . . As a result, a certain degree of brightness can be assured in the non-luminescent region regardless of a long distance between the end portions of the sub-module frames 41, 41, and it can be prevented that the display image shows the black thin lines only at the joining portion.

Seventh Embodiment

A plasma tube array-type display system module 45 according to the seventh embodiment of the present invention is different to the first to sixth embodiments in that, in the case where the plasma tubes 31, 31, 31 for three colors respectively comprising the red (R) phosphor layer 36R, the green (G) phosphor layer 36G, and the blue (B) phosphor layer 36B form one set (one unit), thereby and configuring one pixel, the desirable effect can be obtained as far as the interval between the plasma tube array-type display sub-modules 30*a*, 30*b* adjacent to each other, and a clearance between the sets of the three plasma tubes 31, 31, 31 respectively representing the three different colors, which configure the pixels, are substantially equal.

Figure 8:
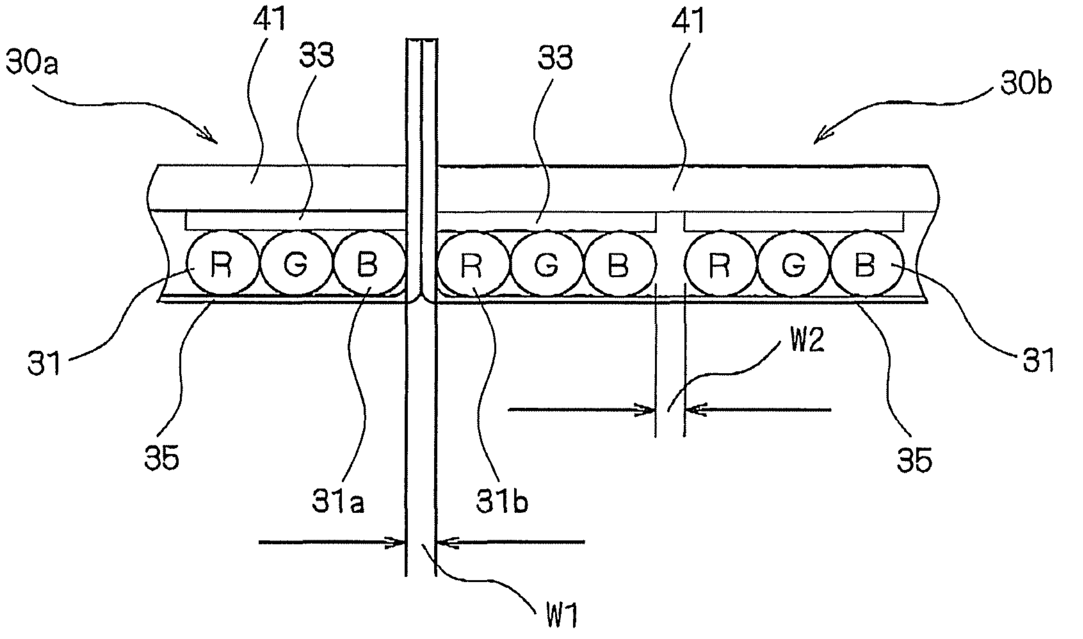
FIG. 8 is a sectional view, orthogonal to the plasma tubes, schematically showing a configuration of the joining portion between the plasma tube array-type display sub-modules according to a seventh embodiment of the present invention.

FIG. 8 is a sectional view, orthogonal to the plasma tubes 31, 31, . . . , schematically showing the configuration of the joining portion between the plasma tube array-type display sub-modules 30, 30 according to the seventh embodiment of the present invention. As shown in FIG. 8, the address electrode support sheet 33 provided with the address electrodes (not shown) is formed on the side of the sub-module frames 41, 41, . . . of the sets of three plasma tubes 31, 31, 31, and the address electrode support sheet 33 is bonded to the sub-module frame 41 via an adhesive layer made of a glue or the like.

At each of an intersection of a plurality of display electrode pairs arranged in such a direction crossing the plasma tubes 31, 31, . . . , and the address electrodes, a discharge cell is formed, and one or a plurality of discharge cells, which is regarded as one unit, configures a pixel. In the seventh embodiment, a set of three plasma tubes 31, 31, 31, configures a pixel as one unit, however, the present embodiment is not limited thereto.

In the seventh embodiment, the address electrode support sheet 33 is bonded to the sub-module frame 41 so that, of the sets of three plasma tubes 31, 31, 31, the plasma tubes 31*a*, 31*b* which are most proximate to the joining portion between the plasma tube array-type display sub-modules 30, 30 are substantially coincident with the end portion of the sub-module frame 41. The display electrode support sheets 35, 35 are bent along the plasma tubes 31*a*, 31*b* placed outside of the sub-module frames 41, 41, and thereby led to the back side of the plasma tube array-type display sub-modules 30*a*, 30*b*.

The interval W1 between the plasma tube array-type display sub-modules 30*a*, 30*b* adjacent to each other is equal to the width corresponding to the thickness of two display electrode support sheets 35, 35, that is, twice the thickness of one display electrode support sheet 35, 100 μm, equals 200 μm. However, the interval W1 is actually larger than the width corresponding to the thickness of two display electrode support sheets 35, 35 as an extra clearance is required in setting the plasma tube array-type display sub-modules 30*a*, 30*b* adjacent to each other, in the manufacturing process and the like.

In the example shown in FIG. 8, the address electrode support sheet 33 is formed by each of the sets of three plasma tubes 31, 31, 31. Therefore, in the assembling of the module, the clearance W2 between the sets of three plasma tubes 31, 31, 31 adjacent to each other is adjusted substantially equal to the interval W1 necessitated when the plasma tube array-type display sub-modules 30*a*, 30*b* adjacent thereto are actually joined to each other. Accordingly, the clearance between the pixels of the displayed image and the width of the non-luminescent region at the joining portion can be substantially equal. Thus, it can be avoided that the display image shows the black thin lines only at the joining portion.

The clearance W2 between the sets of three plasma tubes 31, 31, 31 adjacent to each other and the interval W1 necessitated when the plasma tube array-type display sub-modules 30*a*, 30*b* adjacent thereto are actually joined to one another can be defined substantially equal as far as a percentage of a difference Δ(=|W2−W1|) stays within 10%. As far as the percentage stays within the allowable range of 10%, it can be avoided that the display image shows the black thin lines only at the joining portion. In other words, the clearance W2 between the sets of three plasma tubes 31, 31, 31 adjacent to each other is preferably adjusted so that the difference Δ stays within the range of the following formula 1.

$$|W2-W1|/W1*100 \leqq 10$$

$$|W2-W1|/W2*100 \leqq 10 \quad \text{formula 1}$$

In the clearance W2 between the sets of three plasma tubes 31, 31, 31 adjacent to each other, it is preferable to provide a white or black non-luminescent tube or rod. As the rod have a spacer function, it becomes easy to substantially equalize the clearance W2 between the sets of three plasma tubes 31, 31, 31 adjacent to each other and the interval W1 generated when the plasma tube array-type display sub-modules 30*a*, 30*b* adjacent to each other are actually joined to one another. Thus, a display device capable of realizing a high quality of a display image, in which a disturbance such as the black thin lines displayed at the joining portion is not generated, can be provided.

As described above, according to the seventh embodiment, the non-luminescent region at the joining portion between the adjacent plasma tube array-type display sub-modules 30, 30 can be inconspicuous, and a brightness substantially equal to that of the plasma tubes 31, 31, . . . , configuring other pixels can be maintained thereby. Thus, a display device capable of realizing a high quality of a display image, in which a disturbance such as the black thin lines displayed at the joining portion is not generated, can be provided without using any particular materials for adjusting the interval between the plasma tube array-type display sub-modules 30, 30.

Each of the first to seventh embodiments described above can be independently implemented, or at least two of these embodiments can be arbitrarily combined and then implemented. Moreover, the present invention is not necessarily limited to these embodiments, and various modifications, replacements and the like are possible within the scope of the gist of the present invention.

What is claimed is:

1. A display device comprising:

at least two plasma tube array-type display sub-modules, each having a plurality of plasma tubes arranged in parallel, and a display electrode support sheet attached on a front side of each of the plurality of plasma tubes, joined to one another in a condition in which an end portion of a respective display electrode support sheet is bent back toward a back direction between outermost plasma tubes of each of adjacent plasma tube array-type display sub-modules; wherein an interval between the outermost plasma tubes of each of the adjacent plasma tube array-type display sub-modules including a thickness of both of the end portions of the display electrode support sheets is substantially equal to or smaller than a clearance between each of the adjacent plasma tubes in the respective plasma tube array-type display sub-modules.

2. The display device according to claim 1, wherein the plasma tube array comprises a plurality of sets of three plasma tubes respectively encapsulating therein phosphors corresponding to red (R), green (G) and blue (B) arranged in parallel, wherein the interval between the adjacent plasma tube array-type display sub-modules is substantially equal to or smaller than a clearance between the sets of three plasma tubes.

3. A display device comprising:

at least two plasma tube array-type display sub-modules joined to one another, each comprising:

an address electrode support sheet having address electrodes formed thereon;

a display electrode support sheet having display electrodes formed thereon; and a plasma tube array having a plurality of plasma tubes arranged in parallel, held between the address electrode support sheet and the display electrode support sheet; wherein the plasma tube array comprising a plurality of sets of three plasma tubes respectively encapsulating therein phosphors corresponding to red (R), green (G) and blue (B) arranged in parallel, is attached to a sub-module frame, and an end portion of each display electrode support sheet is bent along a respective outermost plasma tube of adjacent plasma tube array-type display sub-modules and the lead toward a backside through a gap between the adjacent sub-module frames, and the outermost plasma tube of the respective plasma tube array-type display sub-modules is positioned outside the sub-module frame.

4. A display device comprising:

plasma tube array-type display sub-modules joined to one another comprising:

an address electrode support sheet having address electrodes formed thereon;

a display electrode support sheet having display electrodes formed thereon; and a plasma tube array having a plurality of plasma tubes arranged in parallel, held between the address electrode support sheet and the display electrode support sheet; and an end portion of each display electrode support sheet is bent along a respective outermost plasma tubes of adjacent plasma tube array-type display sub-modules and led toward a backside through a gap between the adjacent sub-module frames; wherein a brightness compensating portion for compensating a brightness at a joining portion with another adjacent plasma tube array-type display sub-module is provided.

5. The display device according to claim 4, wherein a light diffusion member for diffusing light toward the side of another adjacent plasma tube array-type display sub-module is provided on the side of the joining portion with the adjacent plasma tube array-type display sub-module as the brightness compensating portion.

6. The display device according to claim 4, wherein a light reflection member for reflecting light to the joining portion between the adjacent plasma tube array-type display sub-modules is provided as the brightness compensating portion.

7. The display device according to claim 4, wherein a light emission brightness of the plasma tubes arranged in the vicinity of the joining portion between the adjacent plasma tube array-type display sub-modules is increased as the brightness compensating portion.

8. The display device according to claim 4, wherein a size of the plasma tubes arranged in the vicinity of the joining portion between the adjacent plasma tube array-type display sub-modules is larger than that of the other plasma tubes as the brightness compensating portion.

9. A display device comprising:

a plurality of plasma tube array-type display sub-modules joined to one another, each comprising:

a plasma tube array having a plurality of plasma tubes filled with a discharge gas and arranged in parallel;

address electrodes arranged along the longitudinal direction of each of the plasma tubes; and a plurality of display electrode pairs formed on a display electrode support sheet and extending in the direction crossing all the plasma tubes thereon so as to define a discharge cell at each of an intersection of the address electrode and the display electrode pair; and an end portion of each display electrode support sheet is bent along a respective outermost plasma tube of adjacent plasma tube array-type display sub-modules and led back toward a back side through a gap between the adjacent sub-module frames, wherein the plasma tubes of the plasma tube array-type display sub-module are arranged so that a clearance between pixels constituted by one or a plurality of discharge cells formed along the display electrode pairs is provided, and the clearance between the pixels is adjusted substantially equal to a clearance between the adjacent plasma tubes arranged outermost of the plurality of plasma tubes in the adjacent plasma tube array-type display sub-modules.

10. The display device according to claim 9, wherein the clearance between the pixels of the plasma tube array-type display sub-modules is provided at each clearance between the pixels defined such that one unit consists of three discharge cells of plasma tubes of three different colors respectively encapsulating therein phosphors corresponding to red (R), green (G) and blue (B) formed along the display electrode pairs.

11. The display device according to claim 10, wherein a non-luminescent tube or rod is provided in the clearance between the pixels as a spacers between the plasma tubes.

12. The display device according to claim 10, wherein a percentage of a difference between the clearance between the pixels and the clearance between the plasma tubes arranged outermost relative to the clearance or the interval stays within 10%.

13. The display device according to claim 10, wherein one unit consists of plasma tubes of three different colors cyclically arranged and respectively encapsulating therein phosphors corresponding to red (R), green (G) and blue (B), the address electrodes corresponding to each plasma tube configuring one unit is bonded to an address electrode support sheet, and a predetermined interval is provided for every unit of plasma tubes.

14. The display device according to claim 9, wherein a non-luminescent tube or rod is provided in the clearance between the pixels.

15. The display device according to claim 9, wherein a percentage of a difference between the clearance between the pixels and the clearance between the plasma tubes arranged outermost relative to the clearance or the interval stays within 10%.

* * * * *